US011576313B2

(12) United States Patent
Stromp

(10) Patent No.: US 11,576,313 B2
(45) Date of Patent: Feb. 14, 2023

(54) SYSTEM, METHOD AND APPARATUS FOR PROVIDING A SOLAR PUMP SYSTEM FOR USE WITHIN A MECHANIZED IRRIGATION SYSTEM

(71) Applicant: Valmont Industries, Inc., Omaha, NE (US)

(72) Inventor: Daniel P. Stromp, Valley, NE (US)

(73) Assignee: VALMONT INDUSTRIES, INC., Omaha, NE (US)

( * ) Notice: Subject to any disclaimer, the term of this patent is extended or adjusted under 35 U.S.C. 154(b) by 263 days.

(21) Appl. No.: 17/110,577

(22) Filed: Dec. 3, 2020

(65) Prior Publication Data

US 2021/0176930 A1    Jun. 17, 2021

Related U.S. Application Data

(60) Provisional application No. 62/947,040, filed on Dec. 12, 2019.

(51) Int. Cl.
*A01G 25/16* (2006.01)
*H02S 40/32* (2014.01)
*H02S 40/38* (2014.01)

(52) U.S. Cl.
CPC .............. *A01G 25/16* (2013.01); *H02S 40/32* (2014.12); *H02S 40/38* (2014.12)

(58) Field of Classification Search
CPC .......... A01G 25/16; H02S 40/32; H02S 40/38; Y02E 10/50; Y02E 70/30; Y02P 60/12
See application file for complete search history.

(56) References Cited

U.S. PATENT DOCUMENTS

2019/0053445 A1*  2/2019  Abdulzahra ............. A01G 9/28

FOREIGN PATENT DOCUMENTS

AU    2017100445 A4 *  5/2017
JP    H0823781 B2 *  3/1996

* cited by examiner

*Primary Examiner* — Chad G Erdman
(74) *Attorney, Agent, or Firm* — Milligan PC LLO

(57) ABSTRACT

The present invention provides a solar power system for use with a mechanized irrigation system. According to a first preferred embodiment, the solar power system of the present includes solar panels which produce DC current which is used to power the irrigation system and to store water in an elevated storage tank. The systems of the present invention selectively use the water stored in the elevated storage tank to provide water pressure to the irrigation system. According to a further preferred embodiment, the system of the present invention preferably converts the power from the solar panels to AC current and uses AC current to power the movement of the irrigation system and other sub-systems.

20 Claims, 5 Drawing Sheets

SYSTEM, METHOD AND APPARATUS FOR PROVIDING A SOLAR PUMP SYSTEM FOR USE WITHIN A MECHANIZED IRRIGATION SYSTEM

RELATED APPLICATIONS

The present application claims priority to U.S. Provisional Application No. 62/947,040 filed Dec. 12, 2019.

FIELD AND BACKGROUND OF THE PRESENT INVENTION

Field of the Present Invention

The present invention relates generally to a system, method and apparatus for irrigation management. More specifically, the present invention relates to a system, method and apparatus for providing a solar pump system within a mechanized irrigation system.

Background of the Invention

Modern irrigation systems consume significant amounts of electrical power. Much of this power demand goes to pumping water throughout the system and creating pressures high enough for irrigation. Usually, this power demand is met with power from the local electrical grid, or if grid power is not available, from a fossil-fueled engine-genset. Grid power, however, comes at an increasingly high cost to the operator, and engine-gensets create air pollution, and require deliveries of fuel as well as regular service and maintenance.

To mitigate these costs, operators have started to use solar power in their fields. Solar power is initially very expensive to use, but over time the adoption of solar power can return significant benefits. For irrigation, these benefits come with several important limitations. First, there is a limit to the power a single solar array can create. Once that limit is reached, the operator must either invest in additional panels or pay for power off the grid or from some other source. Additionally, irrigation uses significant amounts of power within short windows of time. This high level of use often extends beyond the power production capabilities of a conventional solar power system.

Additionally, weather greatly impacts the reliability and power generation levels of solar power systems. Still further, no matter how large, solar power systems do not generate power at night. For each of these reasons, the benefits of using a solar power system for irrigation are limited.

In order to overcome the limitations of the prior art, a system is needed which is able to unlock the benefits of solar power generation to maximize the operational effectiveness of modern irrigation equipment.

SUMMARY OF THE PRESENT INVENTION

To address the shortcomings presented in the prior art, the present invention provides a solar power system for use with a mechanized irrigation system. According to a first preferred embodiment, the solar power system of the present invention includes solar panels which produce DC current. This electrical power is used to power the irrigation system and to pump water into an elevated storage tank. The system of the present invention preferably uses the water stored in the elevated storage tank to provide pressurized water to the irrigation system. The system preferably converts the power from the solar panels to AC current and then uses the AC current to power the movement of the irrigation system and other sub-systems. At the same time, the system preferably uses the stored, pressurized water for irrigation.

According to a further preferred embodiment, the solar panels of the present invention preferably provide DC current to a charge controller, which executes power point tracking calculations to maximize the power extraction by the solar panels based on received current and voltage data. The charge controller may preferably increase the load applied to the solar panels based on the power point tracking calculations. The system of the present invention preferably also includes a battery system for storing excess energy. During times when the solar array produces excess power, that electrical power may be stored in batteries for future use. Then, during times when the solar array is unable to produce sufficient power required for operation of the irrigation system and/or pumps, the batteries may be used to provide the necessary supplementary power. Further, the system of the present invention also preferably includes an inverter which converts DC current received from either the solar array, battery bank (if present) to AC current. The inverter may also convert AC current received from an outside source (i.e. the grid, an engine-powered generator or the like) to DC and direct the DC current to a battery for storage or to the irrigation drive system or well pump motor.

According to a further preferred embodiment, the system of the present invention preferably further includes a system switchboard and a system controller. The system switchboard preferably controls the transmission of AC current to an irrigation drive system and a well pump system. The system controller preferably receives data which may include data such as: solar power production data, storage tank level data (% of full capacity), anticipated water demand data and the like. The system controller may preferably further direct the operation of the well pump to pump water through a water supply pipe to a water storage tank based at least in part on received solar power production data.

The system of the present invention preferably allows the irrigation system to be substantially powered using only off-grid power generated by the solar panels of the system. The system of the present invention preferably also may include multiple smaller pumps and multiple elevated water storage tanks to gravity feed the irrigation system and to produce the pressure required for water distribution.

The accompanying drawings, which are incorporated in and constitute part of the specification, illustrate various embodiments of the present invention and together with the description, serve to explain the principles of the present invention.

DESCRIPTION OF THE PREFERRED EMBODIMENTS

Figure 1:
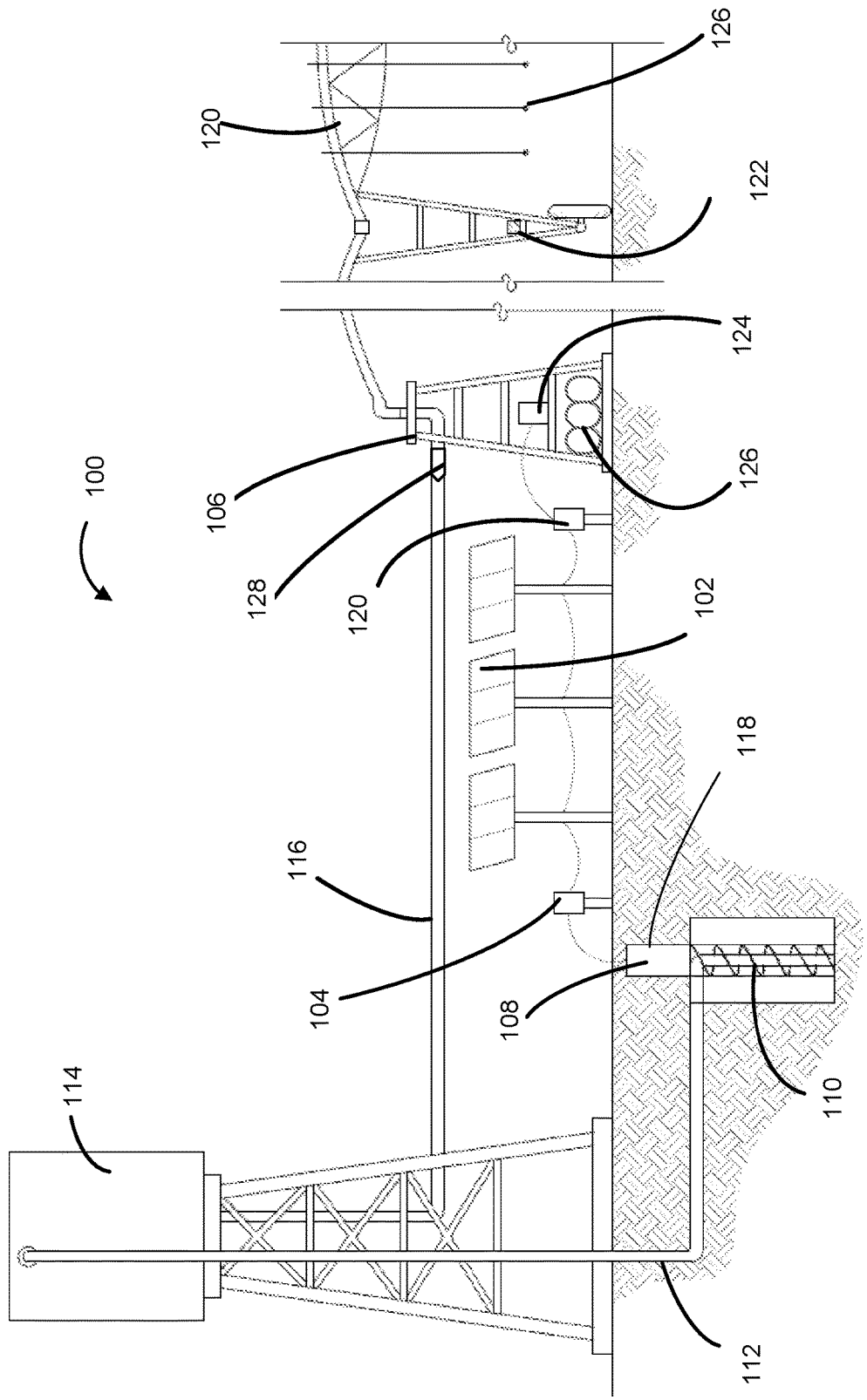
FIG. 1 shows an exemplary irrigation system in accordance with a first preferred embodiment of the present invention.

Aspects of the present invention will be explained with reference to exemplary embodiments and examples which are illustrated in the accompanying drawings. These descriptions, embodiments and figures are not to be taken as limiting the scope of the claims. Further, the word "exemplary" is used herein to mean "serving as an example, instance, or illustration." Accordingly, any embodiment described herein as "exemplary" is not to be construed as preferred over other embodiments. Additionally, well-known elements of the embodiments will not be described in detail or will be omitted so as not to obscure relevant details.

Where the specification describes advantages of an embodiment or limitations of other prior art, the applicant does not intend to disclaim or disavow any potential embodiments covered by the appended claims unless the applicant specifically states that it is "hereby disclaiming or disavowing" potential claim scope. Likewise, the term "embodiments" does not require that all embodiments of the invention include any discussed feature or advantage, nor that it does not incorporate aspects of the prior art which are sub-optimal or disadvantageous.

As used herein, the singular forms "a", "an" and "the" are intended to include the plural forms as well, unless the context clearly indicates otherwise. Additionally, the word "may" is used in a permissive sense (i.e., meaning "having the potential to"), rather than the mandatory sense (i.e. meaning "must"). Further, it should also be understood that throughout this disclosure, unless logically required to be otherwise, where a process or method is shown or described, the steps of the method may be performed in any order (i.e. repetitively, iteratively or simultaneously) and selected steps may be omitted. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The terms "program," "computer program," "software application," "module" and the like as used herein, are defined as a sequence of instructions designed for execution on a computer system. A program, computer program, module or software application may include a subroutine, a function, a procedure, an object implementation, an executable application, an applet, a servlet, a source code, an object code, a shared library, a dynamic load library and/or other sequence of instructions designed for execution on a computer system. A data storage means, as defined herein, includes many different types of computer readable media that allow a computer to read data therefrom and that maintain the data stored for the computer to be able to read the data again.

Aspects of the systems and methods described herein may be implemented as functionality programmed into any of a variety of circuitry, including programmable logic devices, microcontrollers with memory, embedded microprocessors, firmware, software, etc. Furthermore, aspects of the systems and methods may be embodied in microprocessors having software-based circuit emulation, discrete logic (sequential and combinatorial), custom devices, fuzzy (neutral network) logic, quantum devices, and hybrids of any of the above device types.

FIGS. 1-4 illustrate aspects of an exemplary self-propelled irrigation system which may be used with example implementations of the present invention. As should be understood, the irrigation system disclosed in FIGS. 1-4 are exemplary irrigation systems onto which the features of the present invention may be integrated. Accordingly, the figures are intended to be illustrative and any of a variety of systems (i.e. fixed systems as well as linear and center pivot self-propelled irrigation systems; corner systems) may be used with the present invention without limitation.

With reference now to FIG. 1, an exemplary irrigation machine 100 of the present invention is shown. As discussed herein, a key advantage of the present invention is the management of solar power to allow for off-the-grid irrigation of crops (e.g. using primarily self-produced electrical power). The solar power to the system is preferably provided by one or more solar arrays 102 which may be composed of any number of solar panels. The solar array 102 of the present invention preferably may include any number of solar panels connected in series and/or parallel to provide the power requirements of the present invention. The power generated by the solar array 102 is output as a DC current which is directed from the solar array 102 to a charge controller 104.

According to a preferred embodiment, the charge controller 104 of the present invention is preferably capable of maximum power point tracking (MPPT). Specifically, the charge controller 104 of the present invention is preferably programmed to measure the I-V curve output by the solar array and to adjust the load/duty ratio of the system using MPPT algorithms to maximize power extraction under all conditions. Accordingly, when an additional load is beneficial, the charge controller 104 may increase the applied load by causing the well pump 110 to begin or to increase the pumping of water from the well 118 to the water tank 114. In this way, the charge controller 104 may both increase the rate of power extraction and store water under pressure for later use.

With further reference to FIG. 1, the charge controller 104 may additionally direct DC current to either one or more batteries 126, or to an inverter 120. The inverter 120 may convert the received DC current to AC current for instant use by the irrigation system as discussed further below. According to a preferred embodiment, the inverter 120 used with the present invention may be a single mode or multi-mode inverter. As shown in FIG. 1, the AC current may be provided to a variety of systems such water pumping systems and/or span driving systems 122. An exemplary water pumping system may include a pump motor 108 which provides power to a downhole turbine pump 110 or the like. In operation, the pump 110 preferably is positioned under the water line of a well 118 or other water source. The pump 110 preferably provides water under pressure through a water storage pipe 112 for storage within an elevated water tower 114. In addition to using the solar power to pump water into the water tower 114, the system 100 preferably further uses the solar power to power the electro-mechanical systems of pivot point 106 and the irrigation span 120 as discussed further below.

During irrigation operations, the stored water within the elevated water tower 114 is preferably connected (directly or indirectly) via a water supply pipe/network 116 to a pivot point 106 and to one or more irrigation spans 120. According to a preferred embodiment, the stored water within the elevated water tower 114 is preferably sufficient in volume and height to supply water at pressures which meet or exceed the pressure requirements of the sprinklers 126 of the irrigation span 120. Preferably, the pivot controller 124 may receive feedback from one or more transducers 128 to monitor the water pressure provided by the water supply pipe/network 116. Where the detected water pressure falls below the required levels for a given sprinkler set or VRI prescription, the pivot controller 124 preferably may create additional water pressure via an auxiliary pump, water source or the like.

As discussed above, the water tower 114 is preferably elevated to a height sufficient to create water pressure which meets or exceeds the rating of each sprinkler set usable with the irrigation span 120. For example, where an irrigation span sprinkler set will require a minimum of 25 PSI, the water tower 114 is preferably sized and elevated to provide that level of pressure (plus a needed margin based on the type of system and expected losses). Generally, each foot of height provides 0.43 PSI (pounds per square inch) of pressure, so to achieve 25 PSI at the pivot (plus 5 PSI for other pressure losses), the water tower 114 would preferably be elevated to at least 70 feet or higher to provide the necessary pressure.

In the example of FIG. 1, a single solar array 102, water tower 114 and pump 110 are shown. According to alternative embodiments, the present invention preferably may include any number of smaller pumps and storage tanks to gravity feed the irrigation system and to produce the pressure required for water distribution. Further, any number of different solar arrays may be combined within the present invention without limitation.

Figure 2:
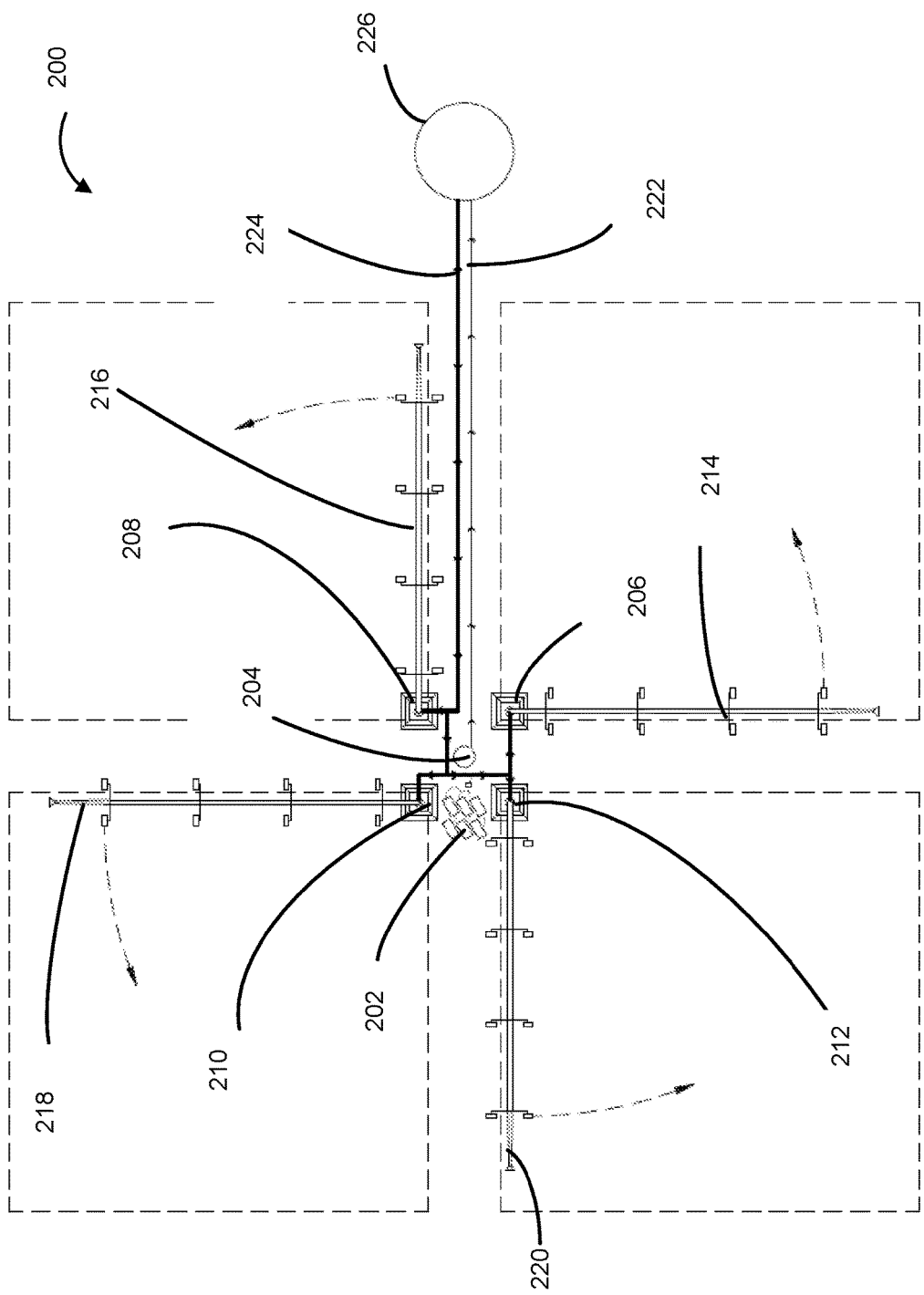
FIG. 2 shows a high level, overhead view of an exemplary irrigation field incorporating aspects of the present invention.

With reference now to FIG. 2, a high level, overhead view of an exemplary irrigation field incorporating aspects of the present invention is provided. As shown, an exemplary field arrangement 200 may include a centrally located solar array 202 located near a water source 204 and one or more pivot points 206-212. Ideally, the solar array 202 may be located very near the water source so that transmission loss from the solar array 202 is minimized. The water storage tank 226 may also be located near the water source and the solar array 202 minimizing the loss of water pressure through the water storage pipe 222 and the water supply pipe 224. Thus, the water storage and transport system of the present invention may provide a long term, highly efficient, environmentally friendly and low maintenance, power storage system for providing water pressure to any number of irrigation spans 214-220.

Figure 3:
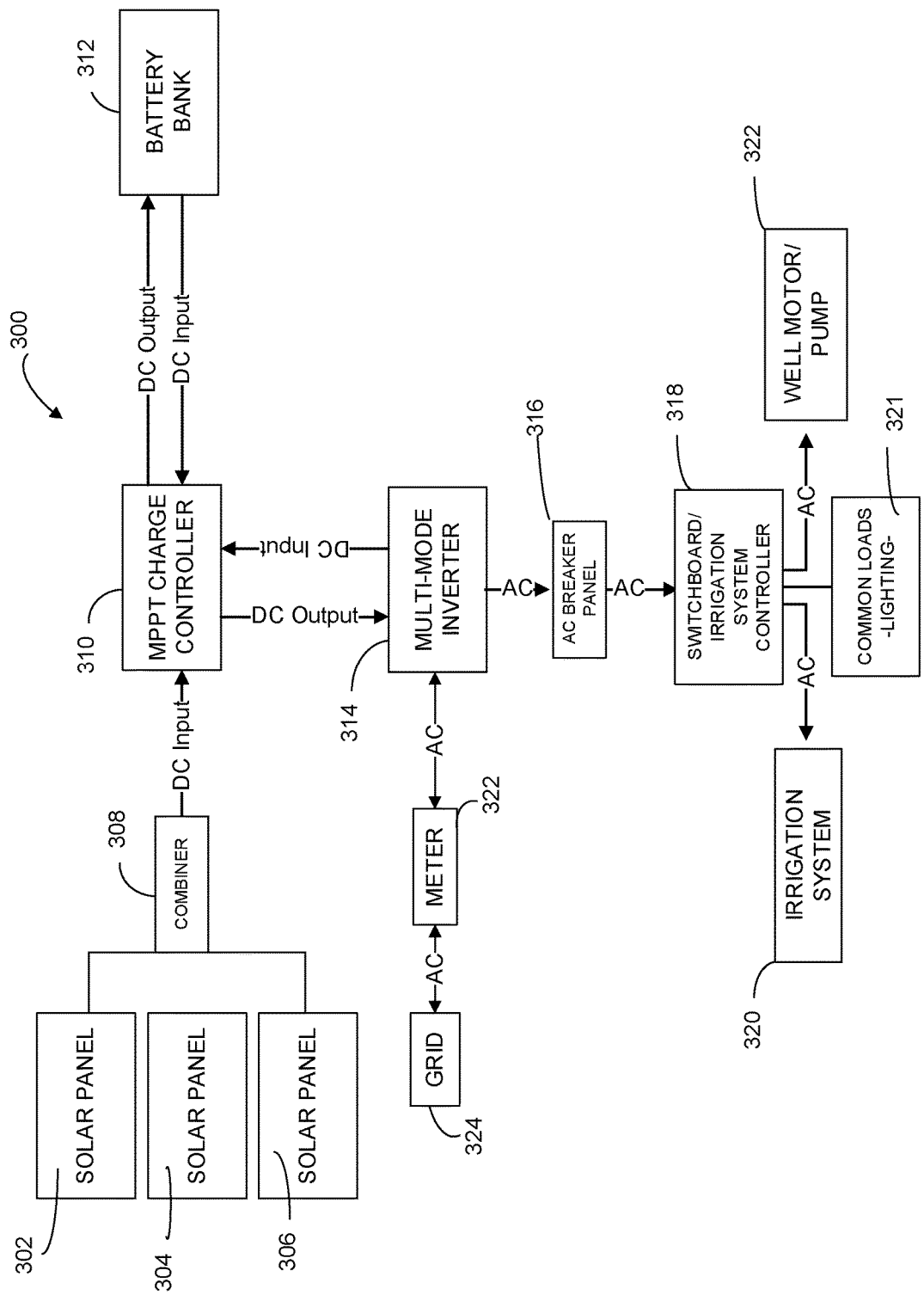
FIG. 3 is a block diagram illustrating an exemplary electrical and control system in accordance with the present invention.

With reference now to FIG. 3, an exemplary electrical system 300 incorporating aspects of the present invention is shown. To complement and support the water distribution system discussed above, the electrical system 300 of the present invention preferably includes one or more solar panels 302, 304, 306 which convert solar radiation to DC current. The DC current from each solar panel 302, 304, 306 is preferably transmitted first to a combiner 308 and then to a charge controller 310. The DC current may then be directly transmitted to a set of batteries 312 for storage. The charge controller 310 may also direct DC current to an inverter 314 which may preferably be a multi-mode inverter capable of converting AC to DC and DC to AC as needed. Additionally, the inverter 314 may receive and transmit AC current to and from an outside electric grid 324 which may be metered 322 to track net electrical consumption. The inverter 314 may further provide AC current to a main switchboard/irrigation controller 318 for selective transmission to various sub-systems including the irrigation system 320, the well motor/pump 322 and other systems and common loads 321 such as lighting and the like.

Figure 4:
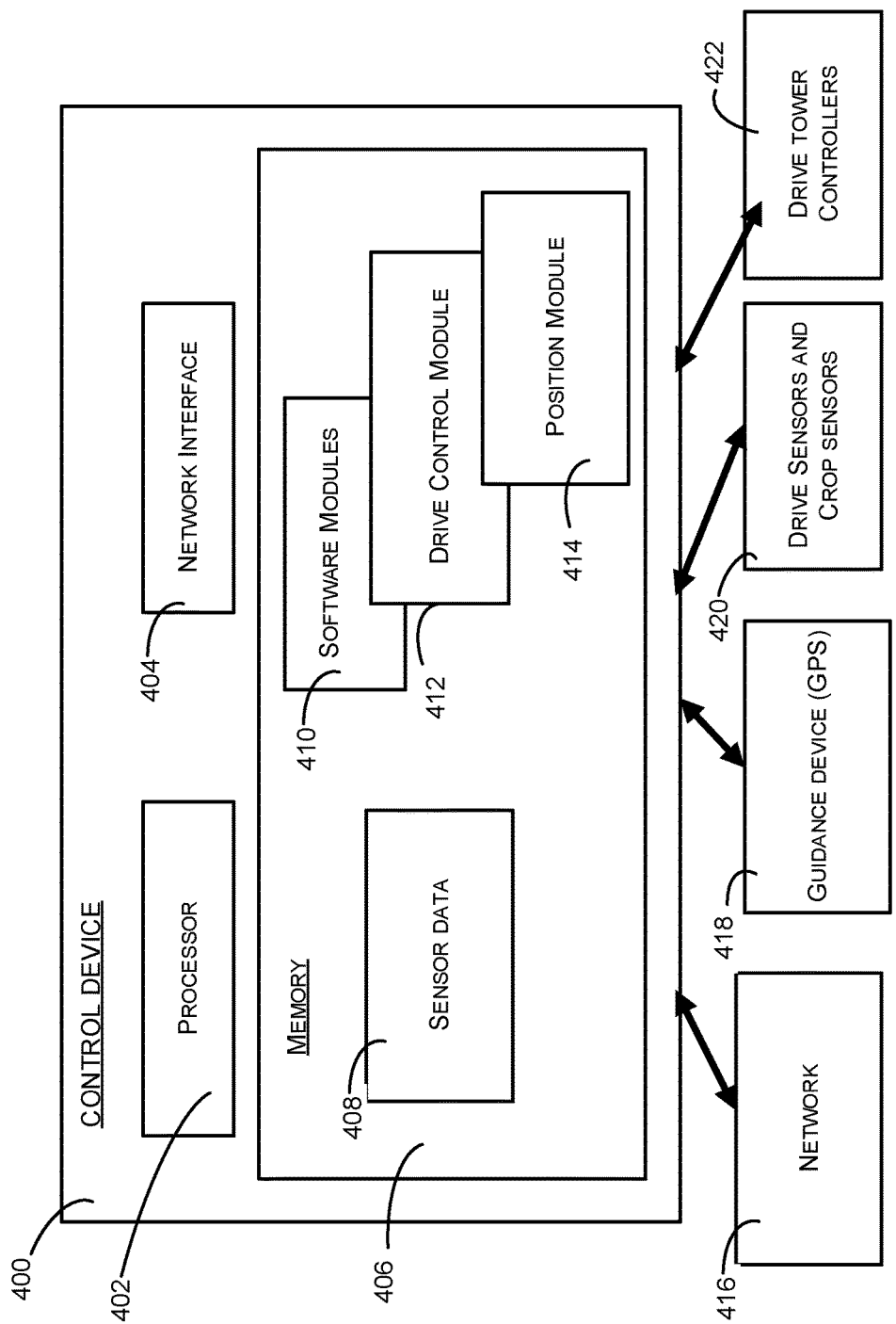
FIG. 4 is a block diagram of an exemplary control device in according with a first preferred embodiment of the present invention.

With reference now to FIG. 4, an exemplary control device 400 which represents functionality to control one or more operational aspects of the irrigation systems 100, 300 of the present invention will now be discussed. As shown, the exemplary control device 400 preferably includes a processor 402, a memory 406, software modules 410 and a network interface 404. The processor 402 provides processing functionality for the control device 400 and may include any number of processors, micro-controllers, or other processing systems. The processor 402 may execute one or more software modules/programs 410 that implement techniques described herein and may process stored sensor data 408 as discussed further below. The network interface 404 preferably provides functionality to enable the control device 400 to communicate with one or more networks 416 through a variety of components such as wireless access points, transceivers and so forth, and any associated software employed by these components (e.g., drivers, configuration software, and so on).

In implementations, the control device 400 preferably includes a position-determining module 414 which may receive input data from a global positioning system (GPS) receiver 418 or the like to calculate a location of the irrigation system 100/300. Further, the control device 400 may be coupled to various drive tower controllers 422 to control and coordinate the movement of the irrigation system 100. As shown, the control device 400 may further include a drive control module 412 to assist in controlling the movement of the system. Further, the control device 400 may preferably further include multiple inputs and outputs to receive data from sensors 420 and monitoring devices as discussed further below.

According to a first preferred embodiment, the control device 400 of the present invention may preferably implement power control algorithms to calculate the power needs for the irrigation of a given field. Based on these calculations, the algorithms of the present invention may selectively use precise amounts of stored, elevated water (i.e. pressurized) as needed to complete a given set of irrigation tasks while minimizing the need for supplemental power (i.e. from the grid). The control device 400 may preferably use the input data to calculate the total power available for the irrigation of a given field. According to a first preferred embodiment, the calculations may include a calculation of the total power available at a particular date and time. For example, this calculation may be as follows:

$$\text{Total Power Available} = \text{Net Solar Power Generation} + \text{Battery Power Stored}$$

Preferably, the algorithms of the present invention may further calculate the total power needed to complete the irrigation of a given field. An exemplary calculation may include input data such as: field slope, field area, traction, irrigation time, water pressure/pump requirements and the like. Additional input data may include data such as: irrigation map data (i.e. GPS dimensions of a given field); soil type; soil moisture; weather data (including storm events, humidity, temperature, wind speed and direction); movement data (including speed and direction of the irrigation machine); and topographical data (including data regarding obstacles and the slope of the terrain to be irrigated). Where available, the calculations may include historic power usage data for the same field which may be adjusted for changes in conditions. Using sets of input data, the system of the present invention may preferably calculate the supplemental power required to irrigate a given field. An exemplary calculation may be as follows:

$$\text{Supplemental Power Required} = \text{Total Power Consumption} - \text{Total Power Available}$$

According to a preferred embodiment, where supplemental power is required, the control device 400 may trigger the system to use water pressure supplied by the elevated water tower 114. As discussed above, the elevated water tower 114 is preferably connected to a pivot point 106 and to one or more irrigation spans 120. According to a preferred embodiment, the stored water within the elevated water tower 114 is preferably sufficient in volume and height to supply water at pressures which meet or exceed the pressure requirements of the sprinklers 126 of the irrigation span 120. In this way, the control device 400 may use the stored water in the elevated water tower 114 to reduce the total power consumption of the irrigation system as needed. Accordingly, the system may reduce the amount of supplemental power used from the grid 324 or from generators.

Preferably, the pivot controller 124 may also receive feedback from one or more transducers 128 to monitor the water pressure provided by the water supply pipe/network 116. Further, the control device 400 of the present invention may preferably receive continual updates from all sensors and systems and may preferably dynamically calculate and update the supplemental power required for the irrigation system in real-time for a given field so that stored, pressurized water can be conserved when not needed.

According to an alternative preferred embodiment, the control device 400 of the present invention may alternatively use the stored, pressurized water to adjust for changes in anticipated solar power production. In this embodiment, the control device 400 of the present invention may preferably receive input data such as: MPPT system data, weather data, field mapping data, water storage level data, battery state-of-charge data, grid power and/or engine-genset power availability and cost, forecasted water demand data, current water and irrigation system energy demand data, and water pressure data. The control device 400 may preferably use the input data to control the power generation, power consumption, scheduling and electro-mechanical activities of the irrigation system. For example, the control device 400 may process selected input data (e.g. solar condition and MPPT load data) and determine/instruct changes to the rate of speed and/or other operating parameters of the irrigation system. For example, where the solar power output is low, the control device 400 may change the operating speed of the system to allow the system to complete an entire watering program without using grid power. Similarly, where solar power output is higher, the control device 400 may increase the speed of the system to maximize the power production during a high sunlight period.

The control device 400 may similarly use internal algorithms to time and schedule when to use solar power to pump water to an elevated water tower and/or to mechanically move system. For example, where a first day is predicted to generate a low amount of solar power, the system may execute an irrigation program requiring a lower speed. On a following day, the system may program and execute a VRI program requiring more power. In another example, where the weather data indicates that a high power generation day is to be followed by a low power generation day, the control device 400 may preferably adjust a given VRI program so that on the high power generating day, the system will directly use generated solar power to both operate the watering system and to supply all needed water pressure. In this way, the system may preserve the amount of water stored at elevation. On the next lower power generating day, the control device 400 may preferably adjust the VRI program to use water provided by the water tank for irrigation and to restrict the use of solar power to moving the irrigation span. The control device 400 may preferably also use stored battery energy along with estimate power generation to determine the ratio of water tank power vs solar power to use. Additionally, the system of the present invention may also charge and/or use battery energy based on the same input data.

The drive control module 412 of the present invention may receive continual updates from all sensors and systems of the present invention so that it may dynamically calculate and update VRI parameters in real-time as the irrigation system executes a given watering plan. For example, the drive control module 412 may receive and adjust target motor speeds based on solar power related data such as: MPPT data; levels of current and forecasted solar power generation; water storage levels; battery storage levels; grid power costs; time shifted grid power costs and the like. Additionally, the drive control module 412 may use the solar power related data in combination with other VRI prescription data to update VRI parameters of a given VRI prescription. Such VRI prescription data may include data such as: irrigation map data (i.e. GPS dimensions of a given field); soil/crop data (crop type, growth stage, irrigation history, soil type and/or measured soil moisture; weather data (including storm events, humidity, temperature, wind speed and direction); movement data (including speed and direction of the irrigation machine); and topographical data (including data regarding obstacles and the slope of the terrain to be irrigated). The drive control module 412 may also analyze the VRI data to trigger a higher rate of speed so that a total irrigation cycle is completed quickly enough to allow the system to initiate a second irrigation cycle to keep up with solar power production.

Figure 5:
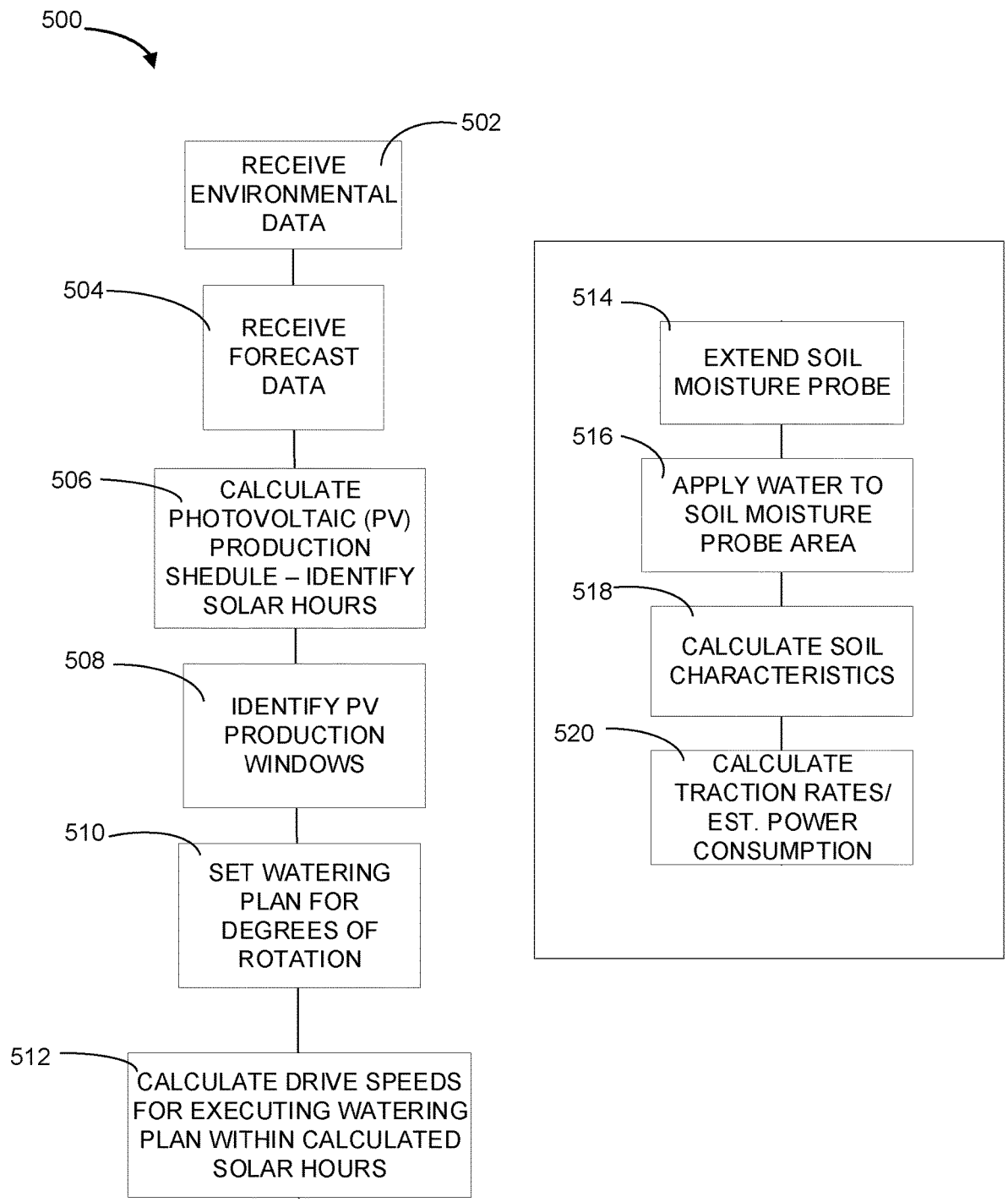
FIG. 5 is a block diagram illustrating an alternative exemplary method for managing an irrigation system in accordance with the present invention.

With reference now to FIG. 5, an alternative exemplary method 500 for managing power and loads during irrigation in accordance with the present invention shall now be discussed. As shown in FIG. 5, according to a first preferred embodiment, at a first step 502 the system may collect and update environmental data. At a next step 504, the system may also receive and update forecast data. Preferably, this data may include factors impacting the amount of solar radiation available to the system and/or other VRI prescription data. These may include factors such as: solar radiation, cloud cover, precipitation, and the like. At a next step 506, the system may then preferably calculate a photovoltaic (PV) production schedule which preferably stores the amounts of PV power which will be produced per segment of time for a given area of field.

At a next step 508, the system may then preferably calculate one or more PV production/irrigation windows which identify and/or maximize the available PV power available for irrigation. Such production windows may define periods of time in which the generated PV meets or exceeds the power needed to execute a given irrigation plan. Alternatively, the production window may define periods of time in which the generated PV meets or exceeds the power needed to execute a given irrigation plan while also using various levels of supplemental power (e.g. battery stored, elevated water storage, limited grid-power). At a next step 510, the system may preferably calculate and store parameters for a watering plan for a desired level of watering to be executed during the calculated PV production windows.

According to a preferred embodiment, the watering plan may preferably be calculated for 400-450 degrees of rotation over an 8-hour period to ensure uniformity in water application. At a next step 512, the system may then preferably calculate and adjust the necessary drive speeds to execute the watering plan within the PV production windows.

According to a further preferred embodiment, the system of the present invention may preferably link to or extend a soil moisture probe into the ground and/or through a given root zone of a selected crop (step 514). According to a preferred embodiment, the probes for use with the present invention may include solar powered, GSM connected soil moisture probes or the like. In accordance with this preferred embodiment, the system may preferably apply a given test amount of targeted water (step 516) onto the soil probed by the soil moisture probe. At a next step 518, the system may thereafter calculate one or more soil characteristics such as soil infiltration rates and the like. According to a further alternative preferred embodiment, other parameters may also be tested on the watered ground such as: evaporation rates, run-off levels and the available traction/slippage on the watered soil. These measured changes (or changes to other VRI prescription data) may then preferably be used by the system of the present invention to update, determine and/or refine changes in energy consumption by the system. These updates may then preferably be used in turn to update the calculated and/or prescribed drive speeds, PV windows, schedules and/or watering rates.

While the above descriptions regarding the present invention contain much specificity, these should not be construed as limitations on the scope, but rather as examples. Many other variations are possible. For example, the communications provided with the present invention may be designed to be duplex or simplex in nature. Further, as needs require, the processes for transmitting data to and from the present invention may be designed to be push or pull in nature. Still, further, each feature of the present invention may be made to be remotely activated and accessed from distant monitoring stations. Accordingly, data may preferably be uploaded to and downloaded from the present invention as needed.

Accordingly, the scope of the present invention should be determined not by the embodiments illustrated, but by the appended claims and their legal equivalents.

What is claimed is:

1. An irrigation system for dispersing input water, wherein the input water is received from a water inlet source, wherein the irrigation system includes at least a first conduit secured to a first span, the irrigation system comprising:
   a plurality of solar panels, wherein the solar panels are configured to output electrical current in the form of DC current;
   a combiner, wherein the combiner is configured to receive multiple DC current inputs from the plurality of solar panels and output a combined DC current;
   a charge controller, wherein the charge controller is configured to receive current and voltage data from the plurality of solar panels; wherein the charge controller is configured to execute a power point tracking calculation to maximize the power extraction of at least one solar panel based on the received current and voltage data; wherein the charge controller is configured to trigger an increase in the load applied to at least a first solar panel based on the power point tracking calculation;
   a battery, wherein the battery is configured to receive and store DC current from the combiner;
   an inverter, wherein the inverter is configured to receive DC current from the combiner and convert at least a portion of the DC current to AC current; further wherein the inverter is configured to transmit a least a portion of the converted AC current to a system switchboard;
   wherein the switchboard is configured to selectively transmit AC current to one or more downstream irrigation systems;
   an inlet source pump; wherein the inlet source pump is configured to direct inlet water into the irrigation system from an inlet source;
   a water storage container, wherein the water storage container is elevated to a height to produce a pressure exceeding 20 PSI;
   a water storage valve, wherein the water storage valve is configured to move between a first position and a second position; wherein in the first position the water storage valve directs inlet water to the first conduit; wherein the first conduit comprises a plurality of sprinklers; wherein in the second position the water storage valve directs the inlet water to the water storage container for storage;
   a storage release valve; wherein the storage release valve is configured to move between a closed position and an open position; wherein in the closed position the storage release valve restricts the inlet water from flowing out of the water storage container; wherein in the open position the storage release valve allows the stored inlet water to flow from the water storage container into the first conduit; and
   a system power controller; wherein the system power controller is configured to receive solar power data and stored battery data; wherein the system power controller is configured to calculate a total power available; wherein the total power available is calculated based on the solar power data and the stored battery data;
   wherein the system power controller is configured to calculate a supplemental power requirement based on the difference between the total power available and the total power needed to irrigate a given field;
   wherein the system power controller is configured to release inlet water stored in the water storage container when the supplemental power requirement exceeds a first threshold value; wherein the amount of inlet water released from the water storage container is selected to achieve a target irrigation water pressure.

2. The irrigation system of claim 1, wherein the first conduit and the first span are supported by a first drive tower having a first drive tower controller, a first drive motor and a first drive wheel; where the irrigation system further comprises a second conduit secured to a second span which is supported by a second drive tower which includes a second drive tower controller, a second drive motor and a second drive wheel; wherein the irrigation further comprises:
   a first motor control system, wherein the first motor control system receives inputs and adjusts the operational status of the first drive motor; and
   a second motor control system, wherein the second motor control system receives inputs and adjusts the operational status of the second drive motor;
   wherein the first and second motor control systems are configured to vary a drive motor characteristic in response to a drive command; wherein the drive motor characteristic is selected from the group of drive motor characteristics comprising: electrical pulse rate, voltage, RPM, current and frequency; wherein the drive command comprises a commanded speed of the irrigation machine; and a drive control system, wherein the drive control system transmits drive commands to the first motor control system and the second motor control system; wherein the drive control system determines the commanded speed based on detected input condition data; wherein the drive control system is configured to execute a first VRI prescription; wherein the first VRI prescription comprises: motor speeds, motor directions, drive wheel paths, and irrigation dispersal rates;

wherein the drive control system is configured to change to the first VRI prescription based on solar power related data; wherein the solar power related data is selected from the group of data comprising: voltage levels; current levels; load data; MPPT data; levels of current and forecasted solar power generation; water storage levels; battery storage levels; grid power costs; and time shifted grid power costs.

3. The irrigation system of claim 1, wherein the irrigation system comprises a first transducer; wherein the first transducer is configured to detect water pressure within the irrigation system; wherein the system power controller is configured to release inlet water stored in the water storage container when the detected water pressure falls below a second threshold value.

4. The irrigation system of claim 3, wherein the second threshold value is determined based at least in part on the water pressure required for a selected sprinkler set.

5. The irrigation system of claim 4, wherein the second threshold value is determined based at least in part on the water pressure required for a second VRI prescription.

6. The irrigation system of claim 5, wherein the total power available is calculated by adding a net solar power generation and a total stored battery power; wherein the system power controller is configured to calculate a supplemental power requirement based on the difference between the total power available and a first total power calculation; wherein the first total power calculation comprises a calculation of the total power needed to irrigate a given field.

7. The irrigation system of claim 6, wherein the first total power calculation is calculated based at least in part on a first set of input data.

8. The irrigation system of claim 7, wherein the first set of input data is selected from the group of input data comprising: field slope, field area, traction, irrigation time, water pressure requirements, soil type, and soil moisture.

9. The irrigation system of claim 8, wherein the first set of input data is selected from the group of input data comprising: storm events, humidity, temperature, wind speed and wind direction.

10. The irrigation system of claim 9, wherein the first set of input data is selected from the group of input data comprising: a programmed speed and direction of the irrigation machine.

11. The irrigation system of claim 10, wherein the first set of input data is selected from the group of input data comprising: the slope of the terrain to be irrigated.

12. The irrigation system of claim 11, wherein the first set of input data is selected from the group of input data comprising: historic power usage data.

13. The irrigation system of claim 12, wherein the system power controller is configured to calculate a second required power amount; wherein the second required power amount is calculated based at least in part on a second set of input data; wherein the second set of input data comprises: MPPT system data, weather data, field mapping data, water storage level data, battery state-of-charge data, grid power availability, grid power cost, forecasted water demand data, irrigation system energy demand data, and water pressure data.

14. The irrigation system of claim 13, wherein the system power controller is configured to adjust a first system parameter based on the second set of input data.

15. The irrigation system of claim 14, wherein the system power controller is configured to change an operating speed of the irrigation system based on the weather data; wherein the weather data comprises detected solar radiation levels.

16. The irrigation system of claim 14, wherein the system power controller is configured to change an operating speed of the irrigation system based on a calculation of whether the irrigation system is able to complete a third VRI program for a given field without using grid power at a given speed.

17. The irrigation system of claim 16, wherein the system power controller is configured to change the third VRI program based on forecasted weather.

18. The irrigation system of claim 17, wherein the system power controller is configured to change the third VRI program for a first day based on a forecasted higher solar radiation level for the first day.

19. The irrigation system of claim 18, wherein the system power controller is configured to change a fourth VRI program scheduled to execute on a fourth day to a fifth VRI program to execute on the fourth day; wherein the fifth VRI program requires less power than the fourth VRI program; wherein the fourth VRI program is changed to the fifth VRI program based at least in part on a higher forecasted solar radiation level for a later fifth day.

20. The irrigation system of claim 19, wherein the system power controller is configured to trigger the use of the stored inlet water on a sixth day based on a higher forecasted solar radiation level for a later seventh day.

* * * * *